United States Patent
Bowen et al.

(10) Patent No.: US 9,751,974 B2
(45) Date of Patent: Sep. 5, 2017

(54) AMINOANTHRACENE—EPOXY NANOCOMPOSITE CONTAINING FREE ANTHRACENE

(71) Applicant: Honeywell Federal Manufacturing & Technologies, LLC, Kansas City, MO (US)

(72) Inventors: Daniel Bowen, Olathe, KS (US); Somnath Sarkar, Warrensburg, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 70 days.

(21) Appl. No.: 14/478,917

(22) Filed: Sep. 5, 2014

(65) Prior Publication Data

US 2015/0073102 A1   Mar. 12, 2015

Related U.S. Application Data

(60) Provisional application No. 61/874,569, filed on Sep. 6, 2013.

(51) Int. Cl.
  *C08G 59/50*   (2006.01)
(52) U.S. Cl.
  CPC .................. *C08G 59/5033* (2013.01)

(58) Field of Classification Search
  CPC .................. C08L 63/00; C08G 59/50
  See application file for complete search history.

(56) References Cited

U.S. PATENT DOCUMENTS

| | | | |
|---|---|---|---|
| 2001/0034333 A1* | 10/2001 | Kosak | A61K 9/1075 514/44 A |
| 2002/0025991 A1* | 2/2002 | Crivello | C07F 7/0854 522/25 |
| 2005/0008964 A1* | 1/2005 | Takei | C08G 59/1455 430/270.1 |
| 2007/0184648 A1* | 8/2007 | Yoon | G03F 7/095 438/636 |
| 2011/0093997 A1* | 4/2011 | Favreau | A43B 3/0026 2/2.5 |
| 2012/0043483 A1* | 2/2012 | Bowen, III | G21F 1/02 250/516.1 |
| 2012/0184634 A1* | 7/2012 | Chen | C08J 11/12 521/42 |

* cited by examiner

*Primary Examiner* — Megan McCulley
(74) *Attorney, Agent, or Firm* — Hovey Williams LLP

(57) ABSTRACT

Polymeric nanocomposite materials are provided comprising polycyclic aromatic hydrocarbon compounds. During polymer synthesis, polycyclic aromatic hydrocarbon groups are directly incorporated into the polymer network. Free polycyclic aromatic hydrocarbon compounds are also dispersed within the polymer matrix. The resulting nanocomposite materials exhibit improvements in the thermal, rheological, and physical properties, including reinforcement, of the polymer material as compared to the unmodified polymer.

23 Claims, 3 Drawing Sheets

AMINOANTHRACENE—EPOXY NANOCOMPOSITE CONTAINING FREE ANTHRACENE

RELATED APPLICATION

This application claims the benefit of U.S. Provisional Patent Application No. 61/874,569, filed Sep. 6, 2013, which is incorporated by reference herein in its entirety.

BACKGROUND OF THE INVENTION

Field of the Invention

The present invention is generally directed toward polymeric nanocomposite materials comprising polycyclic aromatic hydrocarbon groups directly incorporated into a polymer network along with free polycyclic aromatic hydrocarbon compounds dispersed within the polymer matrix. In particular, the polycyclic aromatic hydrocarbon compounds improve the thermal, rheological, and physical properties of the resulting nanocomposites.

Description of the Prior Art

In many rigorous applications for polymeric materials, especially those involving thermoset resins, where there is a desire to modify or change the material to potentially improve it's thermal, rheological, and physical performance, but where modifications or changes to the material are highly undesirable for a variety of reasons, including the material having known and well behaved aging and compatibility characteristics, it may be desirable to be able to make small changes to the material that result in large changes in the material's key properties. One such key property is a polymeric material's glass transition temperature ($T_g$).

The $T_g$, perhaps more than any other property, dictates the temperature above or below which a polymeric material can be used reliably. For example, polystyrene, which is used in the manufacture of foam coffee cups, has a $T_g$ of about 100° C. Above 100° C., above polystyrene's $T_g$, it becomes viscous, flexible, and easily distorted. Thus, polystyrene foam is best suited for use below its $T_g$. Polybutadiene, an elastomer that is used in automobile tires, however, is an example of a polymer that is often utilized at conditions above its $T_g$. Polybutadiene has a $T_g$ of about −103° C. Below this temperature, it is a hard, rigid, inflexible solid.

By changing the $T_g$ of a polymer, it can be made suitable for new applications, or for known applications with different thermal, rheological, and physical requirements. Most often, changing the $T_g$ for a particular polymer may be accomplished through the use of additives that are mixed with the polymer material. Lowering the $T_g$ for a particular polymer may be accomplished, for example, through the use of plasticizers. The addition of fillers can often result in increased $T_g$ values. The use of nanoparticle fillers has been proposed for this purpose, including clay, silica, and carbon black. Nanofillers like these do not consist of discrete molecules, which may be agglomerated or crystallized on the nanoscale, but are rather particles. The effects of the nanoparticle based nanofillers on $T_g$ can be highly material specific and somewhat unpredictable. Scientifically and commercially important molecular nanofillers include Fullerene ($C_{60}$), and polyhedral oligomeric silsesquioxane (POSS), among many others. However, polycyclic aromatic hydrocarbons are also capable of behaving like molecular nanofillers. When applied properly small amounts of polycyclic aromatic hydrocarbons can significantly improve the thermal, rheological, and physical properties of the resulting polymeric nanocomposites, including significant increases in its $T_g$.

SUMMARY OF THE INVENTION

According to one embodiment of the present invention there is provided a polymeric nanocomposite material comprising a polymer matrix and one or more free polycyclic aromatic hydrocarbon compounds dispersed within the polymer matrix. The polymer matrix comprises a polymeric material having one or more bonded polycyclic aromatic hydrocarbon moieties. In particular embodiments, the polymer matrix comprises an epoxy resin polymer having one or more bonded polycyclic aromatic hydrocarbon moieties and one or more free polycyclic aromatic hydrocarbon compounds dispersed within the polymeric matrix, which is in the form of a molecular nanofiller. The polymeric nanocomposite materials generally have improved thermal, rheological, and physical properties, such as increased $T_g$ values, and in certain embodiments exhibit the ability, after a first heating cycle, to physically contract to a final state that is smaller than its original size permitting the polymeric nanocomposite materials to be used in various thermal, optical, thermal/optical sensor applications.

According to another embodiment of the present invention there is provided a method of producing a polymeric nanocomposite material. The method comprises providing one or more resin materials capable of reacting to form a polymeric material. In certain embodiments, the one or more resin materials comprise an epoxy resin and an amine curing agent, although any number of resin systems may be employed without departing from the scope of the present invention. The one or more resin materials are mixed with at least one polycyclic aromatic hydrocarbon compound. The at least one polycyclic aromatic hydrocarbon compound may be dissolved in a suitable solvent prior to mixing with the one or more resin materials. The at least one polycyclic aromatic hydrocarbon compound and the one or more resin materials are reacted under conditions sufficient to form a reaction mixture comprising a polymer having polycyclic aromatic hydrocarbon moieties derived from the at least one polycyclic aromatic hydrocarbon compound. Any solvent residues can be removed from the reaction mixture. Any unreacted polycyclic aromatic hydrocarbon compounds may be dispersed as molecular nanofillers within said composite material.

DETAILED DESCRIPTION OF THE PREFERRED EMBODIMENT

Figure 1:
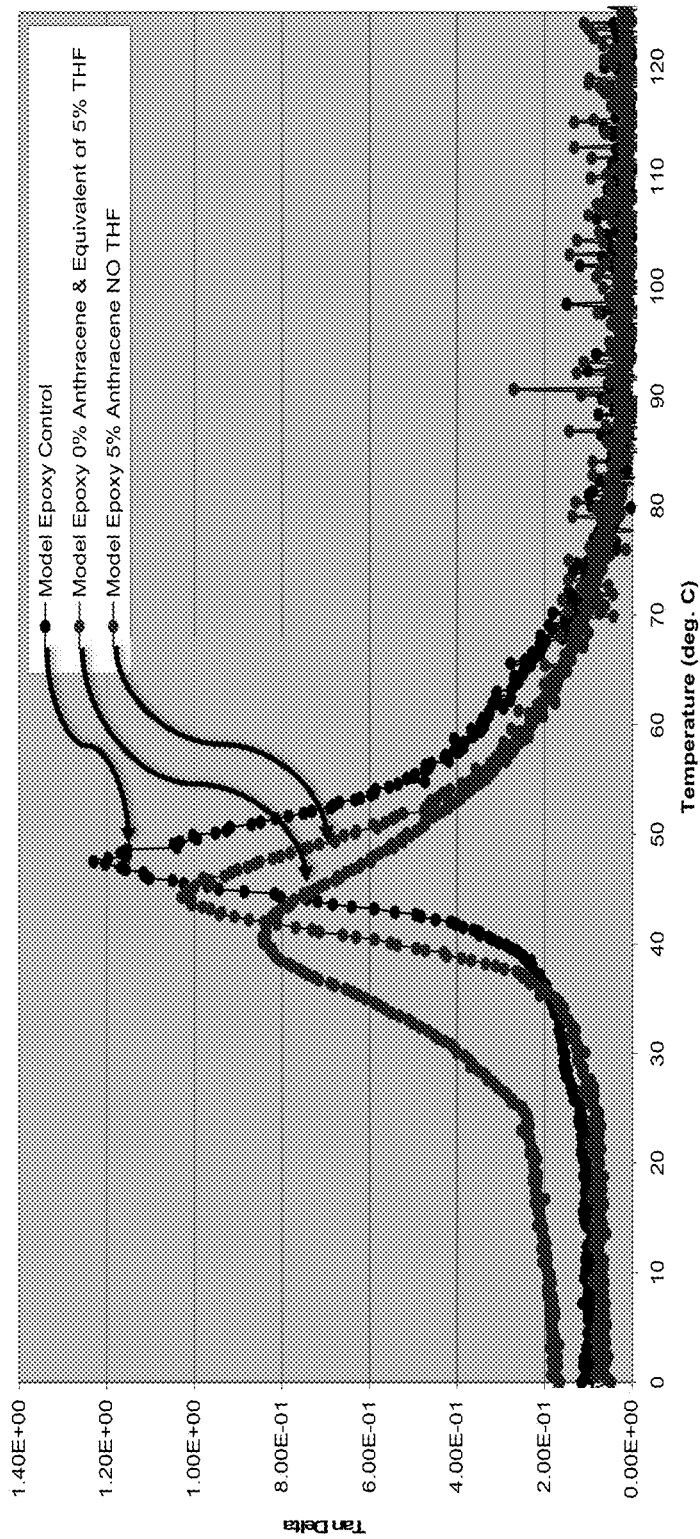
FIG. 1 is a graph of tan delta values versus temperature for various model epoxy compositions comprising anthracene or THF.

Certain embodiments of the present invention are directed toward polymeric nanocomposite materials comprising polycyclic aromatic hydrocarbon compounds (PAHs) that are directly incorporated into (i.e., bonded) into a polymer network as well as PAHs that are freely dispersed (i.e., unbound) within the polymer matrix, for example, as a molecular nanofiller. Although not conventionally thought of as nanoparticles, PAHs are discrete molecules that have been found to improve the thermal, rheological, and physical properties of the polymeric materials in which they have been incorporated when used according to the principles of the present invention. It has been discovered that incorporating PAHs, both bonded and unbound, into a polymer material, new polymeric nanocomposites are created that exhibit improved properties such as tunable $T_g$ values, improved stiffness, tear strength, compression set, density, and aging characteristics. The present invention provides a way of improving existing materials that must remain similar to their historical state, while permitting these materials to be used in applications requiring different performance characteristics.

In certain embodiments, the polymeric nanocomposite material comprises a polymeric matrix. The polymeric matrix generally comprises one or more polymeric materials, which are modified to include a reinforcing moiety as discussed below. In particular embodiments, the polymeric materials are thermosetting synthetic resin polymers that cure upon being mixed. Upon being cured, the chemical transformation that takes place is irreversible. Prior to being cured, however, the thermoset polymers are frequently liquids, or at least are malleable, making them amenable to having fillers mixed into them and/or being reacted with different substituents, especially in the case where the resins can be or have been separated into sub-components. In certain embodiments, the thermoset polymeric resin materials are selected from the group consisting of polyesters, polyurethanes, silicones, epoxies, polyimides, cyanate esters, polyisocyanurates, polycyanurates, diallyl-phthalates, melamines, maleimides, bismaleimides, phenol formaldehydes, phenolics, vinyl esters, and combinations thereof. In certain embodiments, the polymeric materials possess adhesive characteristics and are capable of bonding two chemically similar and/or dissimilar substrates together. In a preferred embodiment of the present invention, the polymeric matrix comprises an epoxy resin polymer. In particularly preferred embodiments, the epoxy resin polymer comprises the reaction product of one or more epoxy-functional monomers and one or more amines. The epoxy-functional monomer may be multi-functional having two or more epoxide functional groups. An exemplary epoxy-functional monomer is EPON 828, which has the following chemical structure:

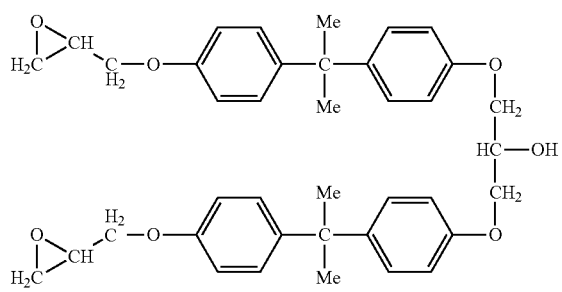 [SMILES: CC(C)(c1ccc(OCC(O)COc2ccc(C(C)(C)c3ccc(OCC4CO4)cc3)cc2)cc1)c1ccc(OCC2CO2)cc1]

The one or more amines function as curing agents by reacting with the epoxide functional groups of the epoxy-functional monomers to form the epoxy resin polymer. In certain embodiments, the amine is aliphatic and multi-functional comprising two or more amino-functional groups. An exemplary amine curing agent is EPICURE 3270 having the following chemical structure:

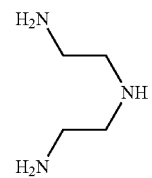

In certain embodiments, the amine is combined with the epoxy-functional monomer within the ratio range of from about 75 to about 100 parts amine (amine equivalent weight) per 100 parts epoxy-functional monomer (epoxy equivalent weight). In particular embodiments, this ratio is about 100 parts amine (amine equivalent weight) per 100 parts epoxy-functional monomer (epoxy equivalent weight).

As noted above, the polymeric materials comprising the polymeric matrix may be reacted with one or more appropriate precursor compounds so as to incorporate a desired polymer-reinforcing moiety into the polymeric network. The reinforcing moiety is selected to alter a physical characteristic of the polymeric material, such as $T_g$ or thermal decomposition characteristics. In order to facilitate the addition of the reinforcing moiety to the polymeric network, the one or more precursor compounds are functionalized so as to be reactive with a particular functional group of the polymeric materials. In certain embodiments according to the present invention, the precursor compounds comprise one or more polycyclic aromatic hydrocarbon compounds (PAHs). Exemplary PAHs that may be used with the present invention include functionalized bicyclic compounds such as those derived from naphthatlene, tricyclic compounds such as those derived from anthracene, and pentacyclic compounds such as those derived from perylene.

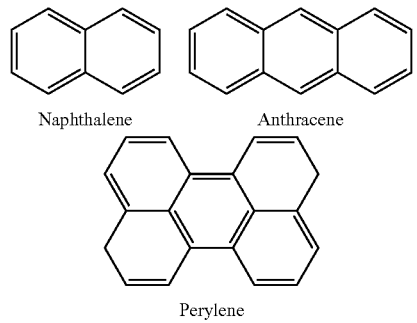

In preferred embodiments of the present invention, functionalized PAH compound comprises an aminoanthracene compound that is selected from the group consisting of 1-aminoanthracene, 2-aminoanthracene, and mixtures thereof.

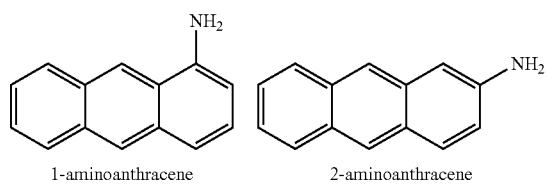

The polymeric nanocomposite materials also comprise free or unbound molecules of a nanofiller compound dispersed within the polymer matrix. As used herein, the term "free" when used in reference to a nanofiller compound refers to a compound that is not chemically bound to the polymer network of the polymer matrix in the same manner as the reinforcing moiety. In certain embodiments, the molecular nanofiller comprises nanosized particles having at least one dimension (e.g., length, width, thickness, diameter, etc.) on the order of approximately 100 nm or less. In certain embodiments, the molecular nanofiller compound is similar in many respects to the reinforcing moiety that has been incorporated into the polymer network of the polymer matrix. For example, the molecular nanofiller compound may be comprised of unreacted precursor compound from which the reinforcing moieties were derived. Thus, the molecular nanofiller compound may comprise a functionalized PAH compound such as those described above. However, it is within the scope of the present invention for the molecular filler compound to comprise a PAH compound that does not possess the same functional group as the precursor compound. In preferred embodiments, though, the molecular nanofiller compound may share the same base chemical structure as its functionalized counterpart that is used as the precursor compound. For example, the molecular nanofiller compound may be selected from the group consisting of naphthalene, anthracene, perylene, and combinations thereof. The filler compound may also comprise a compound having a different base structure from the precursor compound. For example, various asphaltenes may be used as a filler compound in accordance with the present invention.

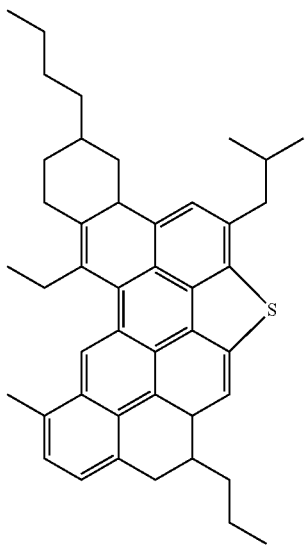

Representative Asphaltene

In certain embodiments of the present invention, anthracene is a preferred nanofiller compound. Anthracene is a polymer additive having fluorescent, scintillator, and optical wave guide properties enabling a variety of applications, including sensor applications. In many sensor applications PAHs can only be used at low relative loadings because of their tendency to phase separate and crystallize, thus causing them to become opaque, although this is highly dependent on the host polymer matrix and the process by which the PAH was incorporated. Anthracene specifically, and PAHs in general, are discrete molecules and are not broadly thought of as nanofillers, but have been discovered to be useful in improving a given polymer's thermal, rheological, and physical properties, including reinforcement, as described herein. In certain embodiments, the PAHs that comprise the polymeric nanocomposite material have relatively high melt points, such as greater than about 80° C., and preferably greater than about 100° C. In other embodiments, the PAHs that comprise the polymeric nanocomposite material have melt points of from about 80 to about 350° C., from about 125 to about 255° C., or from about 140 to about 225° C.

In certain embodiments of the present invention, the PAH nanofiller is present within the polymeric nanocomposite material at a level of from about 0.05 to about 25% by weight, from about 0.1 to about 15% by weight, or from about 0.5 to about 10% by weight. In certain embodiments of the present invention, the PAH moieties bonded to the polymer chain are present within the polymeric nanocomposite material at a level of from about 0.05 to about 25% by weight, from about 0.1 to about 15% by weight, or from about 0.5 to about 10% by weight.

In certain embodiments, polymeric nanocomposite materials according to the present invention are prepared by first providing one or more resin materials that are capable of reacting to form the polymeric material from which the polymeric matrix is comprised. These resin materials may comprise various reactive monomers or oligomers. For example, in the case of an epoxy resin polymer material, the resin materials may comprise an epoxy resin and amine curing agent, such as those described above. The resin materials are then mixed with the precursor compound and separate nanofiller compound, if used, such as those described above.

In particular embodiments, the precursor and molecular nanofiller compounds employed are not soluble in the one or more resin materials. Therefore, the precursor and molecular nanofiller compounds may be dissolved in a solvent prior to being mixed with the one or more resin materials. In certain embodiments, the amount of solvent used is minimized to the extent possible, as certain solvents may have a plasticizing effect upon the polymeric material. Thus, in particular embodiments, the amount of solvent used is the minimum amount required to solubilize the precursor and molecular nanofiller compounds within the one or more resin materials. In certain embodiments, the solvent is an organic solvent such as tetrahydrofuran (THF) or benzene. Because the solvent may operate as a plasticizer, in certain embodiments of the present invention it is desirable to remove the solvent once the reaction between the resin materials and precursor compound is complete. In order to facilitate solvent removal, it is beneficial to utilize a solvent having a relatively low boiling point and a relatively high vapor pressure. In certain embodiments, the solvent has a boiling point of less than less than 125° C., or less than 100° C., or less than 80° C. In certain embodiments, the solvent may also have a vapor pressure of at least 1 kPa, or at least 5 kPa, or at least 10 kPa at 20° C.

The one or more resin materials and the precursor compound are reacted under conditions sufficient to form a reaction mixture comprising a polymer having the reinforcing moieties incorporated into the polymer network. In certain embodiments, the mixture is reacted under solvent reflux conditions. In particular embodiments, the reaction mixture is heated and maintained at a temperature of from about 50 to about 150° C., from about 75 to about 125° C., or from about 100 to about 110° C., for a period of at least 50 hours, or from about 25 to about 100 hours, from about 30 to about 80 hours, or from about 50 to about 70 hours.

After the reaction has occurred for a sufficient amount of time, at least a portion, and preferably all, of the solvent that was used to disperse the precursor and molecular nanofiller compounds is removed from the reaction mixture. In certain embodiments, solvent removal is accomplished by evaporation, which can be expedited through application of heat and/or vacuum.

Illustrative of these concepts is a polymeric nanocomposite material synthesized from EPON 828, EPICURE 3270, 1-aminoanthracene (as the precursor compound), and anthracene (as the molecular nanofiller compound). The 1-aminoanthracene and anthracene are not soluble in the epoxy resin or amine, and thus are dissolved in THF prior to being mixed with the EPON 828 and EPICURE 3270. The 1-aminoanthracene reacts with one of the epoxide groups of the EPON 828 to form an epoxy resin sub-component comprising reinforcing moieties derived from the 1-aminoanthracene, which is later cured by reaction with the EPICURE 3270 sub-component. Upon solvent removal, it is believed that the aromatic groups of the nanoparticulate anthracene form π bonds with the reinforcing moieties to provide the polymeric nanocomposite material depicted below.

PAHs. Illustrative of this effect in epoxy resin polymers, it was observed that when the free PAH is unbound 1-aminoanthracene at ~5 wt %, the $T_g$ was observed to be increased by ~20° C. compared to the unmodified, equivalent epoxy material. Essentially no increase in the $T_g$ was observed when the polymer-bound PAH was 2-aminoanthracene at ~15 wt %. However, when the free PAH is anthracene at ~5 wt % and the bound PAH is 2-aminoanthracene at ~15 wt %, the $T_g$ was observed to increase by ~35° C. The polymeric nanocomposite material may also exhibit an increased thermal stability compared to the unmodified epoxy resin polymer. When anthracene is added as a free PAH at ~5 wt %, the $T_{10}$ temperature (or the temperature by which ~10 wt % of the nanocomposite has decomposed) increases by ~50° C. The final wt % of material remaining or the char weight also increases by ~20 wt %. When the free PAH is anthracene at ~5 wt % and the polymer bound PAH is 2-aminoanthracene at ~5wt %, the $T_{10}$ temperature increases by >90° C. compared to the polymer network by itself without any PAHs included. In other embodiments, the nanocomposite materials also exhibit unexpected important characteristics. For example, in particular embodiments, the polymer nanocomposites containing bound PAH groups and free PAH molecular nanofiller expands and then contracts significantly after its first heat cycle as compared to the polymer

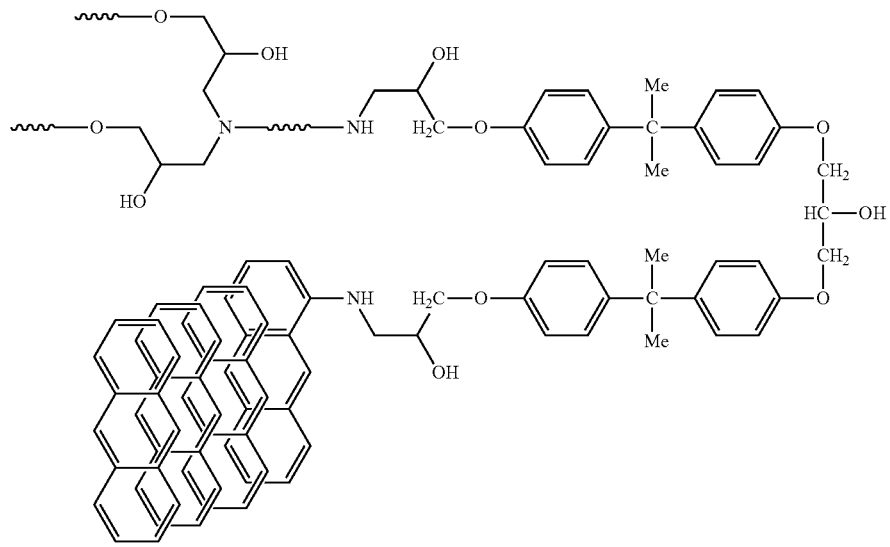

It has been discovered that the use of a combination of a free PAH molecular nanofiller and attachment of a functionalized PAH moiety to the polymer chain results in improvements in the thermal, rheological, and physical properties, including reinforcement, of the polymer material that are greater than those provided by either the free PAH molecular nanofillers, or polymer bonded or dangling PAH side groups by themselves. Some improvement in the polymer materials' physical properties may be a result of the agglomeration or crystallization of the molecular nanofillers on the nanoscale. The additional property improvements observed may be a result of the co-agglomeration or co-crystallization of the polymer bonded or dangling PAH group with the free PAH molecular nanofillers.

In certain embodiments, the resulting new polymeric nanocomposites exhibit increased $T_g$ values as compared with the polymer material without the free and bonded network by itself (without any PAHs), as compared to the polymer network with free PAH nanoparticles, and as compared to the polymer network having the PAH groups but without the free PAH nanoparticles. Note that after the first heat cycle the nanocomposites are only subjected to normal thermal expansion and contraction. When anthracene is added as a free PAH at ~2.5 wt % and the polymer bound PAH is 2-aminoanthracene at ~5 wt % an initial maximum dimensional change of ~65 µm is observed. No dimensional change is observed in the unmodified epoxy polymer, other than normal thermal expansion and contraction. The polymeric nanocomposite material contracts irreversibly to a final state that is smaller dimensionally than its original size, enabling potential thermal, optical, and thermal/optical sensor and other applications, such as waveguide, neutron, and x-ray sensing applications.

EXAMPLES

The following examples set forth composite materials and methods of synthesizing such materials in accordance with certain embodiments of the present invention. It is to be understood, however, that these examples are provided by way of illustration and nothing therein should be taken as a limitation upon the overall scope of the invention.

Example 1

In this example, the rheological effects of the presence of anthracene and THF as simple physical mixtures with a model epoxy comprising EPON 828 (epoxy resin) and EPICURE 3270 (amine curing agent) reacted in approximately equal parts were determined. The anthracene and THF-containing samples were prepared as physical blends with the model epoxy components, molded, and permitted to cure at 110° C. for 57 hours, 52 of which were under vacuum. The samples were formulated as follows:

| Sample Number | Anthracene (wt %) | THF (wt %) |
|---|---|---|
| 1 | 0 | 0 |
| 2 | 0 | 59 |
| 3 | 5 | 0 |

Tan delta values of the model epoxies were determined across a range of temperatures. It was discovered that both anthracene and THF lowered the $T_g$ of the model epoxy. However, as shown in FIG. 1, the plasticizing effects of the THF were much more pronounced.

Example 2

As anthracene was not soluble in the model epoxy used, in this example the anthracene was dissolved in a minimum amount of THF required and physically blended with the model epoxy from Example 1 and cured as described in Example 1. The samples were formulated as follows:

| Sample Number | Anthracene (wt %) | THF (wt %) |
|---|---|---|
| 1 | 0 | 0 |
| 2 | 0 | 59 |
| 3 | 1 | 22 |
| 4 | 2.5 | 42 |
| 5 | 5 | 59 |

Figure 2:
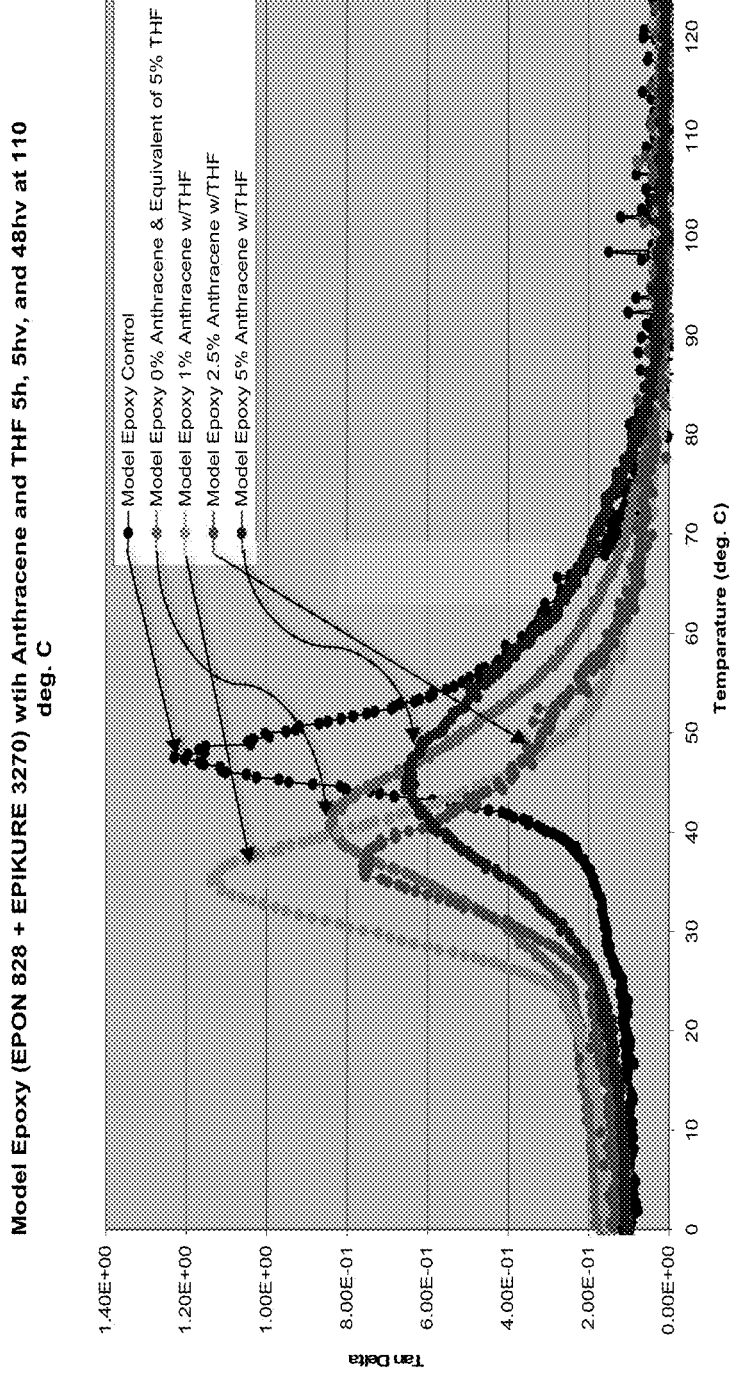
FIG. 2 is a graph of tan delta values versus temperature for model epoxy compositions containing various levels of anthracene.

The rheological effects of the introduction of anthracene dissolved in THF were determined. Tan delta values of the model epoxies were determined across a range of temperatures. As shown in FIG. 2, it was discovered that the plasticizing effects of anthracene and THF diminish as the 5% anthracene level is approached.

Example 3

In this example, epoxy composite formulations comprising physical blends of 1-aminoanthracene dissolved in THF and the model epoxy from Example 1 were prepared and cured as described in Example 1. The samples were formulated as follows:

| Sample Number | 1-Aminoanthracene (wt %) | THF (wt %) |
|---|---|---|
| 1 | 0 | 0 |
| 2 | 0 | 53 |
| 3 | 1 | 53 |
| 4 | 5 | 53 |
| 5 | 15 | 53 |

Figure 3:
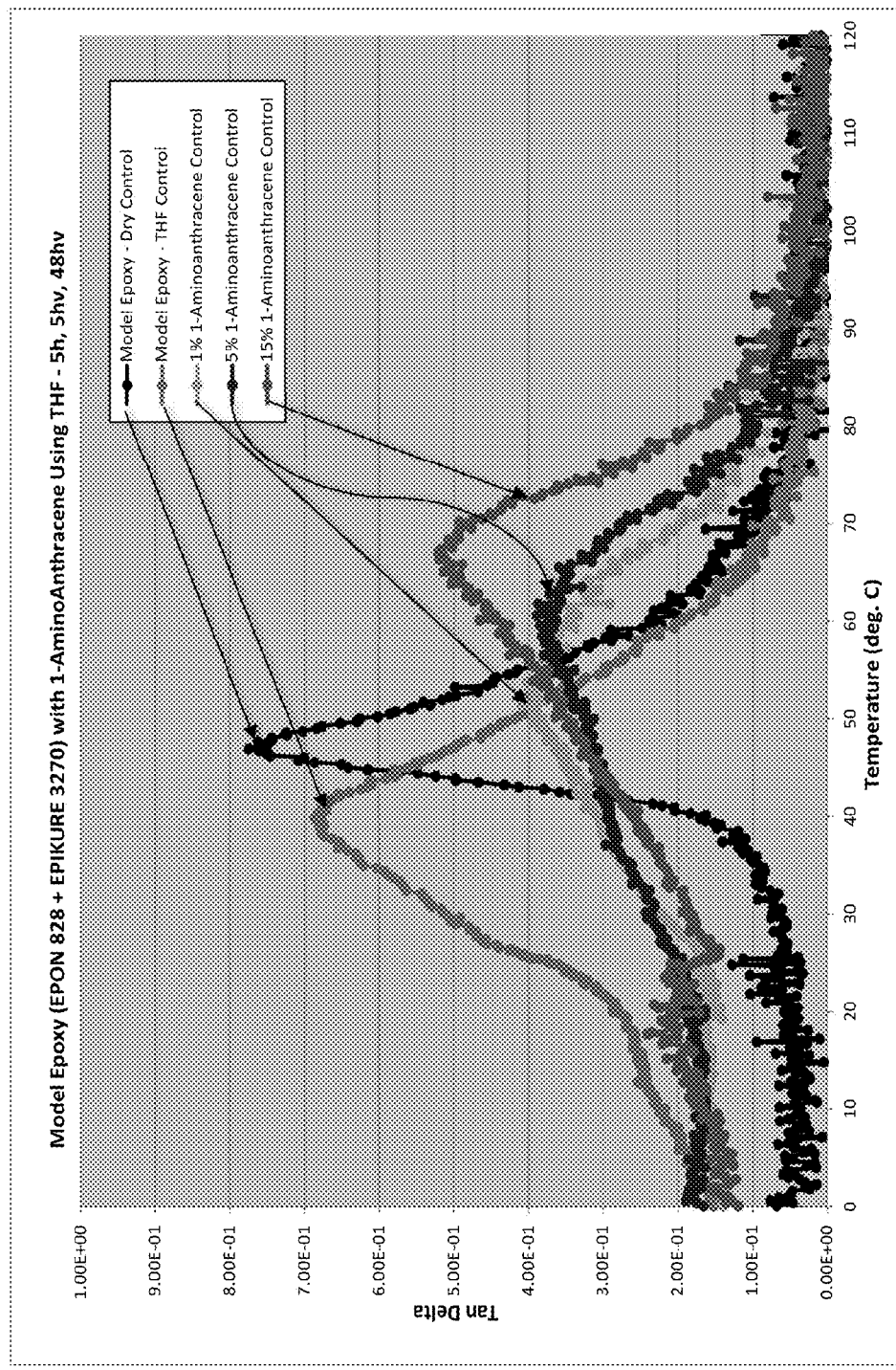
FIG. 3 is a graph of tan delta values versus temperature for model epoxy compositions comprising various levels of 1-aminoanthracene.

The rheological effects of the introduction of 1-aminoanthracene dissolved in THF were determined. Tan delta values of the model epoxies were determined across a range of temperatures. It was discovered, as shown in FIG. 3, that the addition of 1-aminoanthracene increased the Tg of the model epoxy significantly, a maximum increase of 27.8° C.

Example 4

In this example, epoxy composite formulations were prepared using 1-aminoanthracene in combination with free anthracene nanoparticles. The model epoxy from Example 1 was used and mixed with 1-amino anthracene and anthracene nanoparticles dissolved in a minimum amount of THF. Curing of the mixture was performed as described in Example 1. While it was desired to incorporate/bond the 1-aminoanthracene into the epoxy network, it was later determined by TLC that such had not occurred. Therefore, the 1-aminoanthracene was effectively a molecular nanofiller material.

Example 5

In this example, epoxy composite formulations were prepared using 2-aminoanthracene in combination with free anthracene nanoparticles. The model epoxy from Example 1 was used and refluxed with 2-aminoanthracene in THF for several hours in order to incorporate (bond) the aminoanthracene into the epoxy network. Specifically, the amino-modified polycyclic aromatic hydrocarbon 2-aminoanthracene was dissolved in about 20 mL of THF and refluxed with EPON 828 and EPICURE 3270 for 2.5 hours. The 2-aminoanthracene reacts with the EPON 828, but the EPON 828 will also react with the EPICURE 3270 as they are refluxed. TLC confirmed that the reaction was complete after about 2 hours.

The reaction mixture was then cooled and molded. Molding takes several hours (about 3 h), because as the THF evaporates during the molding process, more of the mixture needs to be added to the button molds in order to get enough of the composite into the mold. The molded buttons were then heated under vacuum at 110° C. for 60-70 h. This example utilized a longer drying period that previous examples to ensure evaporation of substantially all of the THF solvent, which was established previously as having plasticizing effects on the epoxy. For samples containing only unmodified PAHs, refluxing was not used. It was discovered that by changing the reaction conditions, the aminoanthracene could be reacted with the epoxy to form an epoxy network having the aminoanthracene incorporated (bonded) therein.

The thermal characteristics of the samples were evaluated, namely $T_g$ and degradation temperature. The results are reported below.

| Sample No. | 2-Amino-anthracene (wt %) | Anthracene (wt %) | $T_g$ (° C.) | Degradation T (° C.) | | |
|---|---|---|---|---|---|---|
| | | | | 5% loss | 10% loss | 20% loss |
| 1 | 0 | 0 | 42.07 | 205.69 | 252.35 | 338.94 |
| 2 | 0 | 2.5 | 57.67 | 236.63 | 299.29 | 350.71 |
| 3 | 0 | 5 | 57.71 | 240.78 | 310.05 | 351.45 |
| 4 | 1 | 0 | 36.21 | 200.46 | 248.6 | 342.04 |
| 5 | 1 | 2.5 | 44.48 | 225.32 | 276.28 | 341.82 |
| 6 | 1 | 5 | 47.92 | 224.16 | 275.29 | 348.39 |
| 7 | 5 | 0 | 55.13 | 201.69 | 245.19 | 333.93 |
| 8 | 5 | 2.5 | 69.82 | 309.58 | 342.78 | 358.66 |
| 9 | 5 | 5 | 62.57 | 285.4 | 339.91 | 358.6 |
| 10 | 15 | 0 | 40.50 | 207.61 | 255.38 | 338.51 |
| 11 | 15 | 2.5 | 75.73 | 332.66 | 352.9 | 367.47 |
| 12 | 15 | 5 | 77.15 | 338.36 | 351.31 | 362.23 |

As can be seen from this data, higher loading levels of 2-aminoanthracene and anthracene resulted in a large shift in $T_g$ as compared to the control model epoxy (sample). The data also confirms that the shift in $T_g$ appears to be more than an additive effect and establishes that a synergy is occurring when the aminoanthracene is incorporated into the epoxy network and anthracene is used as a filler. The thermal decomposition analysis also indicates that incorporating 2-aminoanthracene into the epoxy network and combining it with anthracene appears to have a synergistic improvement in thermal stability.

We claim:

1. A nanocomposite material comprising:
a polymer matrix comprising a polymeric material having one or more functionalized polycyclic aromatic hydrocarbon moieties, wherein said one or more functionalized polycyclic aromatic hydrocarbon moieties comprise fused aromatic rings; and
from about 0.05 to about 25% by weight, based upon the weight of said nanocomposite material, of one or more functionalized or non-functionalized free polycyclic aromatic hydrocarbon compounds dispersed within said polymer matrix, wherein said one or more free polycyclic aromatic hydrocarbon compounds comprise fused aromatic rings.

2. The nanocomposite material according to claim 1, wherein said one or more polycyclic aromatic hydrocarbon moieties comprise from about 0.05 to about 25% by weight of said nanocomposite material.

3. The nanocomposite material according to claim 1, wherein said functionalized polycyclic aromatic hydrocarbon moiety comprises an aminoanthracene derivative.

4. The nanocomposite material according to claim 1, wherein said polymeric material comprises an epoxy resin polymer.

5. The nanocomposite material according to claim 4, wherein said one or more functionalized polycyclic aromatic hydrocarbon moieties are attached to said epoxy resin polymer via nucleophilic addition to one or more epoxide moieties.

6. The nanocomposite material according to claim 1, wherein said one or more free polycyclic aromatic hydrocarbon compounds comprise a member selected from the group consisting of asphaltenes, functionalized asphaltenes, anthracene, functionalized anthracenes, naphthalene, functionalized naphthalenes, and combinations thereof.

7. The nanocomposite material according to claim 6, wherein said one or more free polycyclic aromatic hydrocarbon compounds comprises an aminoanthracene compound.

8. The nanocomposite material according to claim 1, wherein said one or more polycyclic aromatic hydrocarbon moieties are derived from said one or more polycyclic aromatic hydrocarbon compounds.

9. The nanocomposite material according to claim 1, wherein said composite material comprises a $T_g$ value that is greater than the $T_g$ value of said polymeric material without said polycyclic aromatic hydrocarbon moieties.

10. The nanocomposite material according to claim 1, wherein said nanocomposite material has a thermal decomposition temperature that is greater than the thermal decomposition temperature of said polymeric material without said polycyclic aromatic hydrocarbon moieties.

11. A nanocomposite material comprising:
a polymer matrix comprising an epoxy resin polymer having one or more functionalized polycyclic aromatic hydrocarbon moieties, wherein said one or more functionalized polycyclic aromatic hydrocarbon moieties comprise fused aromatic rings; and
from about 0.05 to about 25% by weight, based upon the weight of said nanocomposite material, of a molecular nanofiller comprising one or more functionalized or non-functionalized free polycyclic aromatic hydrocarbon compounds dispersed within said polymer matrix, wherein said one or more free polycyclic aromatic hydrocarbon compounds comprise fused aromatic rings.

12. The nanocomposite material according to claim 11, wherein said one or more free polycyclic aromatic hydrocarbon compounds comprise a member selected from the group consisting of asphaltenes, functionalized asphaltenes, anthracene, functionalized anthracenes, naphthalene, functionalized naphthalenes, and combinations thereof.

13. The nanocomposite material according to claim 12, wherein said one or more free polycyclic aromatic hydrocarbon compounds comprises an aminoanthracene compound.

14. The nanocomposite material according to claim 11, wherein said epoxy resin polymer comprises the reaction product of an epoxy-functional monomer and an amine curing agent.

15. The nanocomposite material according to claim 11, wherein said functionalized polycyclic aromatic hydrocarbon moiety is an aminoanthracene derivative.

16. A method of producing a nanocomposite material comprising:
providing one or more resin materials capable of reacting to form a polymeric material;
mixing said one or more resin materials with at least one amino-functional polycyclic aromatic hydrocarbon compound, wherein said at least one amino-functional polycyclic aromatic hydrocarbon compound comprises fused aromatic rings;
reacting said at least one amino-functional polycyclic aromatic hydrocarbon compound and said one or more resin materials under conditions sufficient to form a reaction mixture comprising a polymer having amino-functional polycyclic aromatic hydrocarbon moieties derived from said at least one amino-functional polycyclic aromatic hydrocarbon compound, wherein said amino-functional polycyclic aromatic hydrocarbon moieties comprise fused aromatic rings, and wherein said reaction mixture comprises said nanocomposite material, said nanocomposite material comprising from about 0.05 to about 25% by weight, based upon the weight of said nanocomposite material, of a molecular nanofiller comprising unreacted amino-functional polycyclic aromatic hydrocarbon compound.

17. The method according to claim 16, wherein said at least one polycyclic aromatic hydrocarbon compound is dispersed in a solvent prior to being mixed with said one or more resin materials.

18. The method according to claim 17, wherein said method further comprises, following said reacting step, removing at least a portion of said solvent from said reaction mixture.

19. The method according to claim 17, wherein said reacting step comprises reacting said at least one polycyclic aromatic hydrocarbon compound and said one or more resin materials under reflux conditions.

20. The method according to claim 16, wherein said one or more resin materials comprise an epoxy resin having at least two epoxide functional groups and an aliphatic amine curing agent.

21. A nanocomposite material comprising:
a polymer matrix comprising a polymeric material having one or more polycyclic aromatic hydrocarbon moieties and said polymeric material comprises an epoxy resin polymer, wherein said one or more polycyclic aromatic hydrocarbon moieties comprise fused aromatic rings, wherein said one or more polycyclic aromatic hydrocarbon moieties are attached to said epoxy resin polymer via nucleophilic addition to one or more epoxide moieties; and
from about 0.05 to about 25% by weight, based upon the weight of said nanocomposite material, of one or more functionalized or non-functionalized free polycyclic aromatic hydrocarbon compounds dispersed within said polymer matrix, wherein said one or more free polycyclic aromatic hydrocarbon compounds comprise fused aromatic rings.

22. A nanocomposite material comprising:
a polymer matrix comprising a polymeric material having one or more polycyclic aromatic hydrocarbon moieties, wherein said one or more polycyclic aromatic hydrocarbon moieties comprise fused aromatic rings; and
from about 0.05 to about 25% by weight, based upon the weight of said nanocomposite material, of a free polycyclic aromatic hydrocarbon compound dispersed within said polymer matrix comprising an aminoanthracene compound.

23. A nanocomposite material comprising:
a polymer matrix comprising an epoxy resin polymer having one or more polycyclic aromatic hydrocarbon moieties, wherein said one or more polycyclic aromatic hydrocarbon moieties comprise fused aromatic rings; and
from about 0.05 to about 25% by weight, based upon the weight of said nanocomposite material, of a molecular nanofiller comprising a free polycyclic aromatic hydrocarbon compound dispersed within said polymer matrix an aminoanthracene compound.

* * * * *

UNITED STATES PATENT AND TRADEMARK OFFICE
CERTIFICATE OF CORRECTION

PATENT NO. : 9,751,974 B2
APPLICATION NO. : 14/478917
DATED : September 5, 2017
INVENTOR(S) : Daniel Bowen and Somnath Sarkar Page 1 of 1

It is certified that error appears in the above-identified patent and that said Letters Patent is hereby corrected as shown below:

In the Specification

Please insert the following paragraph immediately above paragraph 1:
-- STATEMENT REGARDING FEDERALLY-SPONSORED RESEARCH OR DEVELOPMENT
This invention was made with government support under Contract No.: DE-NA0000622 awarded by the Department of Energy. The government has certain rights in the invention. --

Signed and Sealed this
Second Day of July, 2019

Andrei Iancu
*Director of the United States Patent and Trademark Office*